No. 815,842. PATENTED MAR. 20, 1906.
E. LE FEVER.
AXLE LUBRICATOR.
APPLICATION FILED JULY 29, 1905.
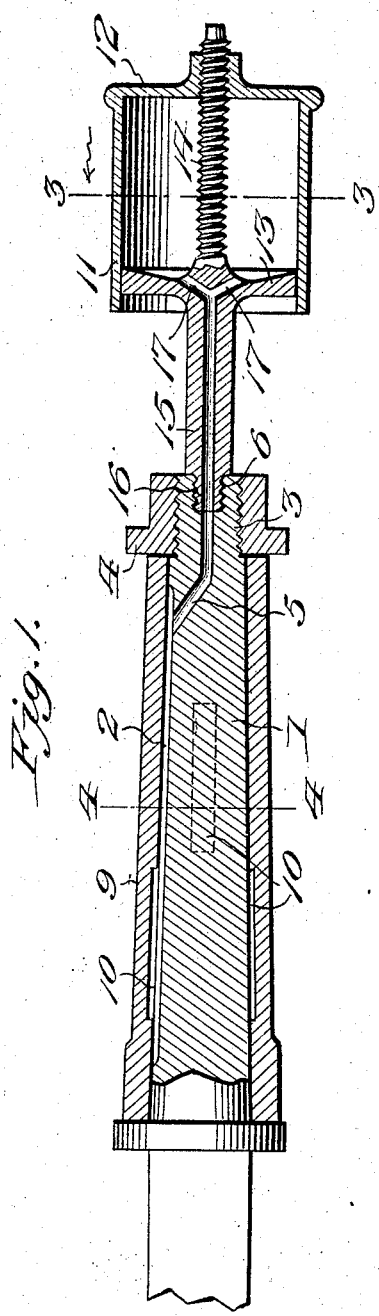
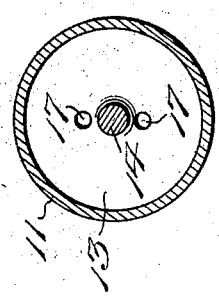
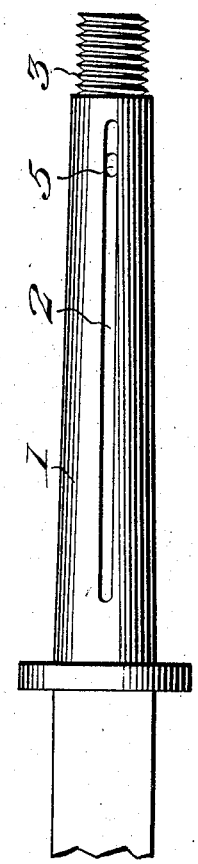
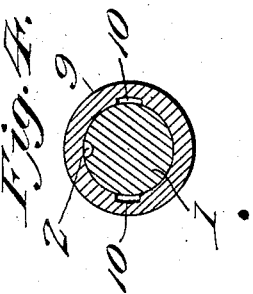
Witnesses
Edwin G. McKee
C. C. Hines
Inventor
Eugene Lefever
By Victor J. Evans
Attorney

UNITED STATES PATENT OFFICE.

EUGENE LE FEVER, OF ROSENDALE, NEW YORK.

AXLE-LUBRICATOR.

No. 815,842.　　　Specification of Letters Patent.　　　Patented March 20, 1906.

Application filed July 29, 1905. Serial No. 271,752.

*To all whom it may concern:*

Be it known that I, EUGENE LE FEVER, a citizen of the United States, residing at Rosendale, in the county of Ulster and State of New York, have invented new and useful Improvements in Axle-Lubricators, of which the following is a specification.

This invention relates to improvements in axle-lubricators, and has for its object to provide a construction of axle and lubricator whereby a suitable quantity of lubricant may be supplied to the axle-box without detaching the axle-nut or removing the wheel from the axle-spindle.

A further object is to provide a lubricator which may be readily applied for use and removed after the required amount of lubricant has been supplied.

The preferred embodiment of the invention is illustrated in the accompanying drawings, in which—

Figure 1 is a longitudinal section through an axle spindle and box and the lubricator applied thereto for use. Fig. 2 is a plan view of the axle-spindle. Fig. 3 is a cross-section through the lubricator on the line 3 3 of Fig. 1. Fig. 4 is a similar view through the axle spindle and box on the line 4 4 of Fig. 1. Fig. 5 is a detail longitudinal section through the outer end of the spindle and cooperating parts, showing the plug applied to close the feed-duct.

Referring now more particularly to the drawings, the numeral 1 designates an axle-spindle provided upon its upper surface with a longitudinal lubricating-groove 2 and having a reduced threaded terminal 3 for the reception of the axle-nut 4, which confines the wheel upon the spindle. The groove 2 communicates at its outer end with the inner end of a feed-duct 5, extending diagonally in an outward direction toward the center of the spindle and thence centrally through threaded terminal 3, which is provided at its outer end with a threaded socket 6, communicating with said duct. The socket 6 is adapted to be closed normally by a screw-plug or other suitable closure 7, said plug having an angular head 8, by which it is adapted to be applied and removed by a wrench or analogous tool. The axle box or skein 9 may be provided with any desired number and arrangement of interior lubricating-grooves 10 to store with the groove 2 in the spindle a sufficient amount of lubricant to keep the parts lubricated for a desired period, the lubricant being distributed over the spindle by the rotation of the wheel in the usual manner.

The lubricating device comprises a lubricant-containing casing 11, closed at its outer end by a head 12 and open at its inner end. Operating in said casing is an expressing follower or piston 13, provided with a screw-shank 14, mounted in a threaded opening in the head 12, thus permitting the casing to be moved longitudinally along said shank by a rotary movement. From the side of the piston opposite the shank projects a hollow feed-stem 15, provided at its outer end with a reduced threaded ejector-nozzle of proper diameter to fit within the socket 6 in the extremity of the axle-spindle. The bore of the stem 15 is in communication with diverging passages 17, leading therefrom through the body of the piston and communicating with the interior of the casing 11.

When it is desired to supply the axle spindle and box with a charge of lubricant, the plug 7 is removed from the socket 6 and the lubricating device applied by fitting the nozzle 16 thereof in said socket. The casing 11 is then turned up on the shank 14, thereby forcing the lubricant from said casing through the stem 15 into the feed-duct 5 and thence to the groove 2, whence it is distributed by the motion of the wheel over the bearing-surfaces of the axle and box. After the desired amount of lubricant has been supplied the lubricator is detached and the plug 7 applied to close the socket 6. By this means the axle may be lubricated without removing the axle-nut 4 or wheel.

Having thus fully described my invention, what I claim as new, and desire to secure by Letters Patent, is—

A lubricator comprising a casing, a piston provided at one side with a threaded shank upon which the casing is revolubly mounted and upon its opposite side with a feed-stem adapted to be attached to the axle and brought into communication with said duct, the piston having passages communicating with the stem and interior of the casing, whereby when the casing is adjusted the lubricant will be forced therefrom through said stem and into said duct.

In testimony whereof I affix my signature in presence of two witnesses.

EUGENE LE FEVER.

Witnesses:
　A. B. DU BOIS,
　RALPH H. LEFEVER.